(12) United States Patent
Carter

(10) Patent No.: US 8,966,378 B2
(45) Date of Patent: Feb. 24, 2015

(54) COMMUNITY INTEREST NETWORK

(76) Inventor: Christopher Caleb Carter, Douglasville, GA (US)

(*) Notice: Subject to any disclaimer, the term of this patent is extended or adjusted under 35 U.S.C. 154(b) by 165 days.

(21) Appl. No.: 13/159,059

(22) Filed: Jun. 13, 2011

(65) Prior Publication Data

US 2011/0307803 A1    Dec. 15, 2011

Related U.S. Application Data

(60) Provisional application No. 61/354,374, filed on Jun. 14, 2010.

(51) Int. Cl.
*G06F 3/00* (2006.01)
*G06F 17/30* (2006.01)
*G06Q 10/10* (2012.01)

(52) U.S. Cl.
CPC .......... *G06Q 10/10* (2013.01); *G06F 17/30528* (2013.01)
USPC ........... 715/744; 715/747; 707/737; 707/778; 707/786

(58) Field of Classification Search
None
See application file for complete search history.

(56) References Cited

U.S. PATENT DOCUMENTS

| | | | |
|---|---|---|---|
| 8,175,638 B2* | 5/2012 | Cowherd | 455/556.1 |
| 2005/0171799 A1* | 8/2005 | Hull et al. | 705/1 |
| 2007/0038594 A1* | 2/2007 | Goodwin et al. | 707/2 |
| 2008/0005073 A1* | 1/2008 | Meek et al. | 707/3 |
| 2008/0140650 A1* | 6/2008 | Stackpole | 707/5 |
| 2009/0313291 A1* | 12/2009 | White | 707/102 |
| 2010/0185580 A1* | 7/2010 | Zhu et al. | 706/52 |
| 2010/0318551 A1* | 12/2010 | Lai | 707/765 |

* cited by examiner

*Primary Examiner* — Matt Kim
*Assistant Examiner* — Hua Lu
(74) *Attorney, Agent, or Firm* — Alston & Bird LLP

(57) ABSTRACT

Various embodiments of the present invention provide systems, methods, and computer program products for providing a community interest network that is developed on a societal relationship platform. In various embodiments, the platform is based on a collection of online, virtualized social communities oriented around interests. Further, in various embodiments, the community interest network includes a directory structure that is hierarchical and is built on a number of interest accounts tied to a specific tier structure (e.g., tier classification).

17 Claims, 9 Drawing Sheets

Node Structure

COMMUNITY INTEREST NETWORK

CROSS-REFERENCE TO RELATED APPLICATIONS

This application claims the benefit of U.S. Provisional Application Ser. No. 61/354,374, filed Jun. 14, 2010, the contents of which are incorporated herein by reference in its entirety.

BACKGROUND

With the development of the Internet, social network sites have become very popular. For instance, social network sites such as MySpace®, Facebook®, and Bebo® have attracted millions of users. Typically, a social network comprises web-based services that allow individuals to construct a profile within a bounded network, identify lists of other users as connections, and interact with users on their lists and with users on other lists via these connections established within the network. Thus, in various social networks, the critical features of the networks are the profiles of various users and the connections (relationships) established among these profiles. In many instances, a user of a particular social network is required to identify others (e.g., "friends") in the network to establish these connections. For example, a user in Facebook® searches the other users of Facebook® and requests a particular user's friendship to establish a connection with that user. In this particular case, the particular user must confirm the user's request to establish the connection.

Further, in particular social networks, the public display of these connections is a critical component of the network. For example, a user may visit a "friend's" profile in the network and may view the "friend's" list of friends. In many instances, the "friend's" list of friends will include links to each friend's profile found on the list. This allows the user to traverse the social network to view other user's profiles and discover other users that the user may wish to befriend. Thus, in these instances, the connections in the social network are established by users of the network identifying and establishing connections with each other.

However, such networks only provide limited or no mechanisms for allowing users to identify and to connect with other users that may have common interests. For instance, Facebook® allows a user to set up a fan page that may be tied to a particular interest. However, the fan page basically represents a member page within the network without the functionality of a member. Therefore, a need exists for a social network that allows for connections (relationships) to be established based on interests.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
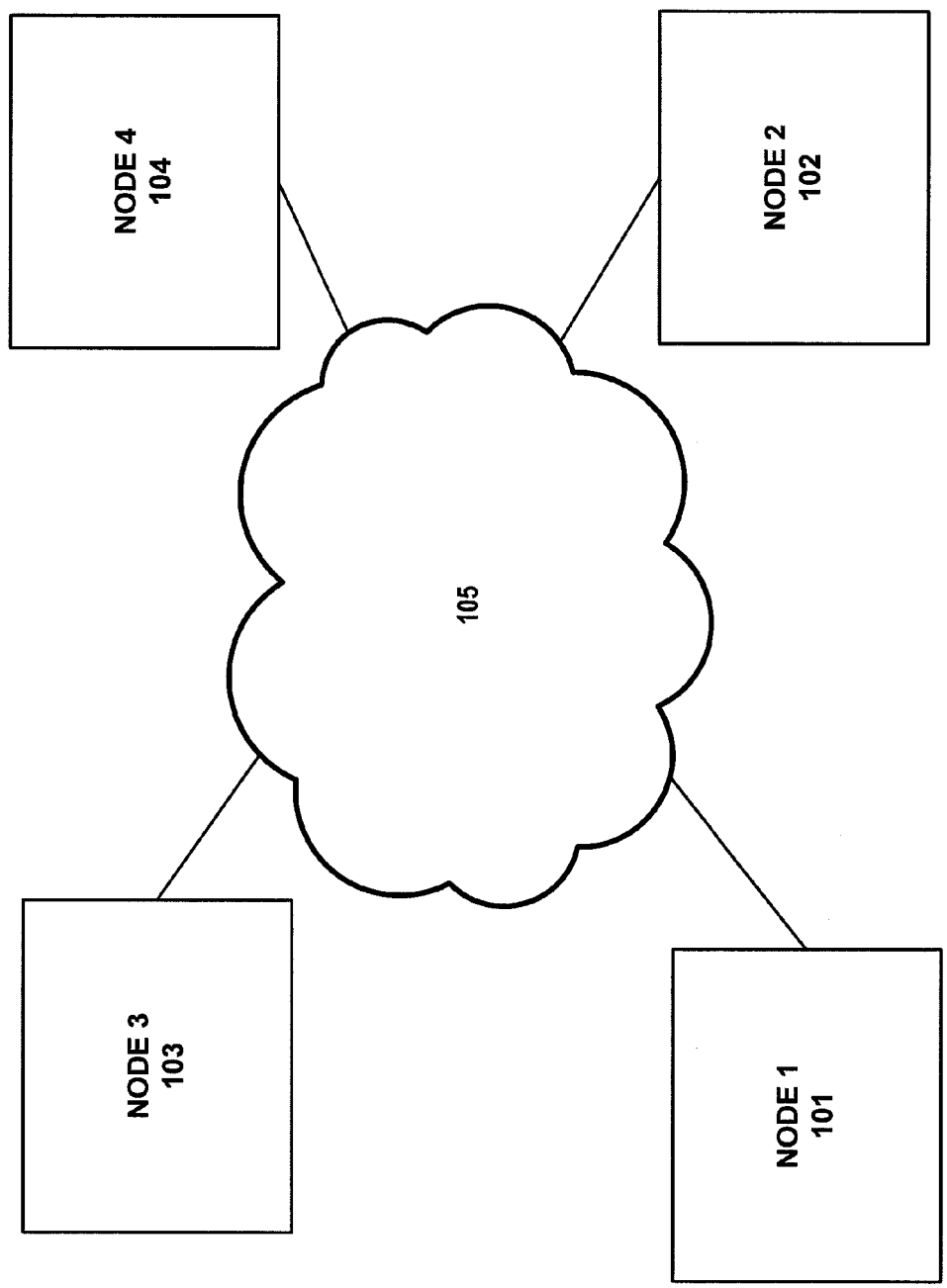
FIG. 1 shows an overview of one embodiment of a system that can be used to practice aspects of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a community interest network that can be used in conjunction with various embodiments of the present invention. As shown in FIG. 1, the network includes one or more nodes 101, 102, 103, 104 that are in electronic communication with, for example, one another over the same or different wireless or wired networks 105 including a wired or wireless Personal Area Network ("PAN"), Local Area Network ("LAN"), Metropolitan Area Network ("MAN"), Wide Area Network ("WAN"), the Internet, or the like. In various embodiments, each node is associated with a particular geographic area.

Figure 2:
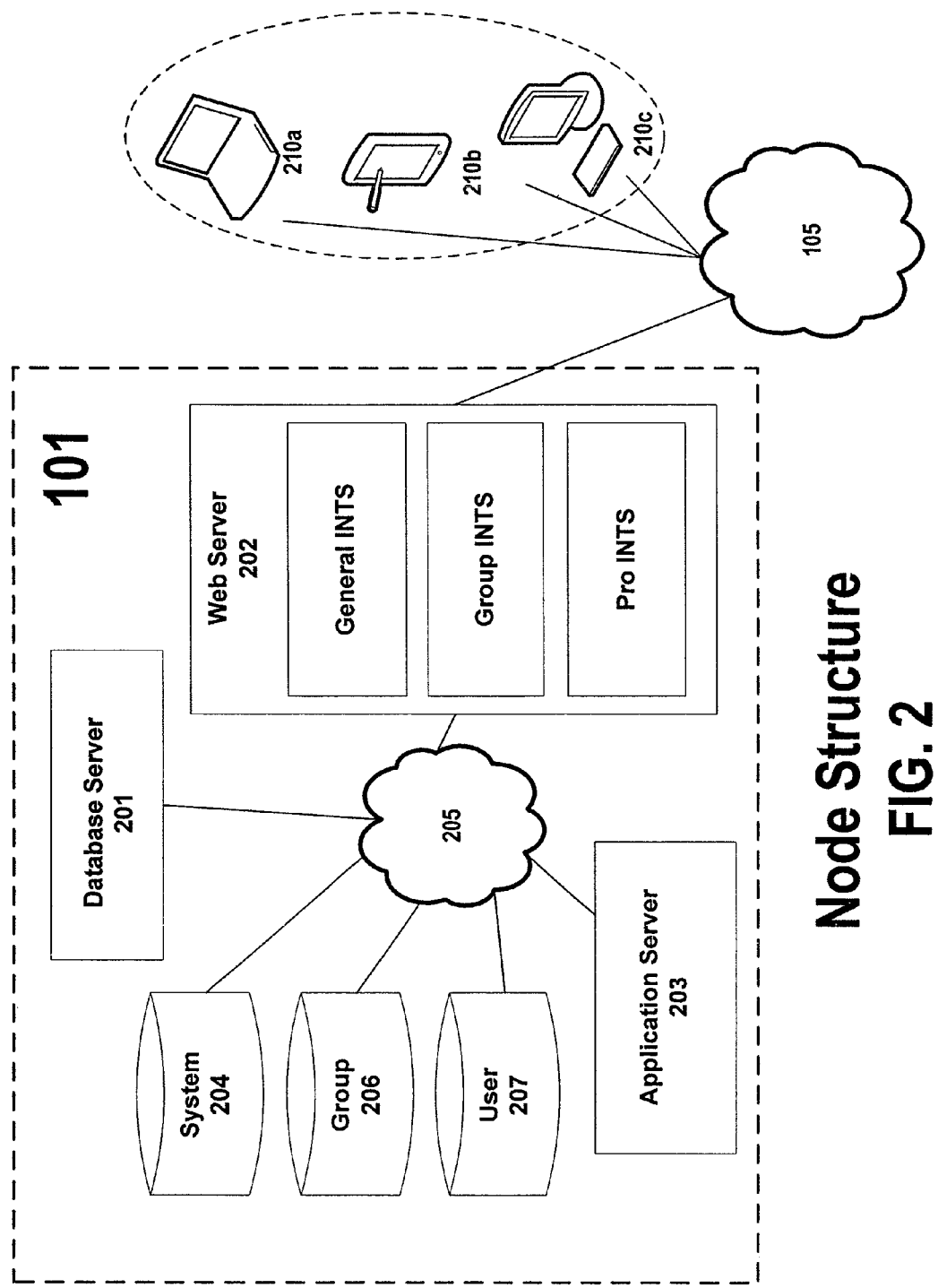
FIG. 2 shows a node structure according to one embodiment of the present invention.

Further, FIG. 2 provides an illustration of a node according to one embodiment of the present invention. A node may be a collection of servers that provide web services, database operations, and object storage for the network accounts associated with a particular geographic area. As is described in greater detail below, these accounts represent various users, interests, organizations, groups, and businesses in the community interest network. The node depicted in FIG. 2 includes a database server 201, storage media 204, 206, 207, a web server 202, and an application server 203. In various embodiments, the database server 201 may include a database management system and the storage media 204, 206, 207 may include one or more databases and one or more database instances. In various embodiments, the storage media 204, 206, 207 may be one or more types of medium such as hard disks, magnetic tapes, or flash memory. The term "database" refers to a structured collection of records or data that is stored in a computer system, such as via a relational database, hierarchical database, or network database. For example, in one embodiment, the storage media 204, 206, 207 includes a database that stores system information, a database that stores group information, and a database that stores user information. This information may include system, group, and account information and objects associated with these accounts.

In various embodiments, the web server 202 provides web services to users of the community interest network. For instance, the web server 202 delivers web pages to browsers as well as other data files to web-based applications. Thus, in various embodiments, the web server 202 includes the hardware, operating system, web server software, TCP/IP protocols and site content (web pages, images and other files). As shown in FIG. 2, the web server 202 in particular embodiments include site content associated with various interests. As is described in greater detail below, these interests may be broken down into general interests, group interests, and professional interests and provide structure within the community interest network.

In the embodiment displayed in FIG. 2, the web server 202 communicates over the network 105 (such as the Internet) with a plurality of user computing devices 210a, 210b, 210c. These computing devices 210a, 210b, 210c may include such devices as a desktop computer, notebook or laptop, personal digital assistant (PDA), cell phone, or other processing devices. In particular embodiments, the users participate in the community interest network over the network 105 via one or more web pages provided by the web server 202.

Further, in various embodiments, the application server 203 provides applications that are used to provide functionality within the community interest network. For instance, in one embodiment, the application server 203 includes a user module, a group create module, and a group tree module. These modules provide such functionality as creating user (e.g., personal) and group accounts that are used in the community interest network and establishing relationships among users and groups. These servers 201, 202, 203 and storage media 204, 206, 207 may also be in electronic communication with one another within the node. For instance, these servers 201, 202, 203 and storage media 204, 206, 207 may be in communication over the same or different wireless or wired networks 205 including, for example, a wired or wireless Personal Area Network ("PAN"), Local Area Network ("LAN"), Metropolitan Area Network ("MAN"), Wide Area Network ("WAN"), the Internet, or the like. Finally, while FIGS. 1 and 2 illustrate the various system and node entities as separate, standalone entities, the various embodiments are not limited to these particular architectures.

a. Application Server

Figure 3:
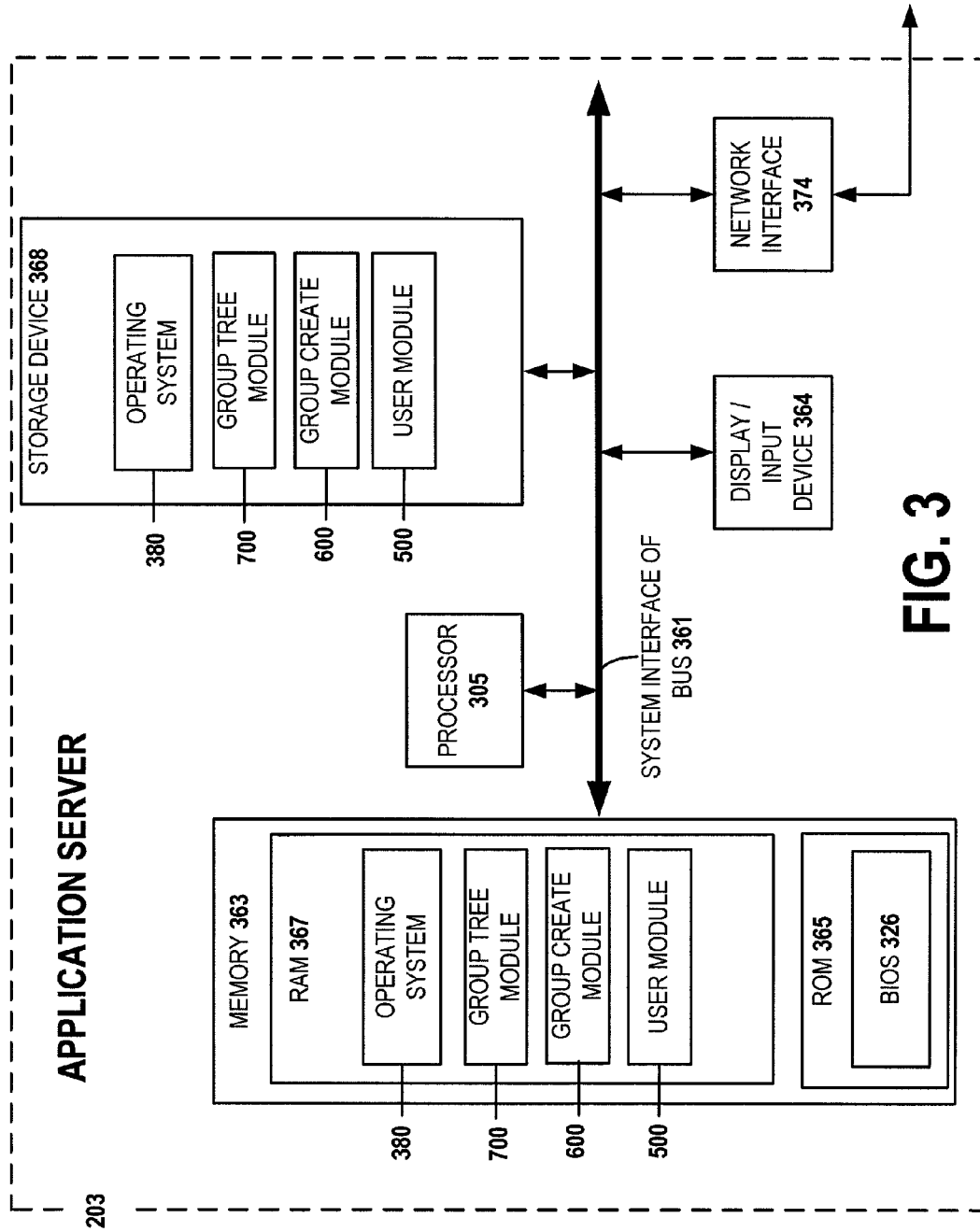
FIG. 3 shows an exemplary schematic diagram of an application server according to one embodiment of the present invention.

FIG. 3 provides a schematic of an application server 203 according to one embodiment of the present invention. The term "server" is used generically to refer to any computer, computing device, desktop, notebook or laptop, distributed system, server, gateway, switch, or other processing device adapted to perform the functions described herein. As will be understood from this figure, in this embodiment, the application server 203 includes a processor 305 that communicates with other elements within the application server 203 via a system interface or bus 361. The processor 305 may be embodied in a number of different ways. For example, the processor 305 may be embodied as various processing means such as a processing element, a microprocessor, a coprocessor, a controller or various other processing devices including integrated circuits such as, for example, an application specific integrated circuit ("ASIC"), a field programmable gate array ("FPGA"), a hardware accelerator, or the like. In an exemplary embodiment, the processor 305 may be configured to execute instructions stored in the device memory or otherwise accessible to the processor 305. As such, whether configured by hardware or software methods, or by a combination thereof, the processor 305 may represent an entity capable of performing operations according to embodiments of the present invention while configured accordingly. A display device/input device 364 for receiving and displaying data is also included in the application server 203. This display device/input device 364 may be, for example, a keyboard or pointing device that is used in combination with a monitor. The application server 203 further includes memory 363, which may include both read only memory ("ROM") 365 and random access memory ("RAM") 367. The application server's ROM 365 may be used to store a basic input/output system ("BIOS") 326 containing the basic routines that help to transfer information to the different elements within the application server 203.

In addition, in one embodiment, the application server 203 includes at least one storage device 368, such as a hard disk drive, a CD drive, and/or an optical disk drive for storing information on various computer-readable media. The storage device(s) 368 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 368 may be connected to the system bus 361 by an appropriate interface.

Furthermore, a number of program modules (e.g., set of computer program instructions) may be stored by the various storage devices 368 and/or within RAM 367. Such program modules may include an operating system 380, a user module 500, a group create module 600, and a group tree module 700. These modules 500, 600, 700 may control certain aspects of the operation of the application server 203 with the assistance of the processor 305 and operating system 380, although their functionality need not be modularized.

Also located within the application server 203, in one embodiment, is a network interface 374 for interfacing with various computing entities, such as the web server 202. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the application server 203 may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the application server's 203 components may be located remotely from other application server 203 components, such as multiple application servers 203 serving certain geographic areas. Furthermore, one or more of the components may be combined and additional components performing functions described herein may be included in the application server 203.

b. Additional Exemplary System Components

The plurality of user computing devices 210a, 210b, 210c and the web server 202 may each include components and functionality similar to that of the application server 203. For example, in one embodiment, each of the entities may include: (1) a processor that communicates with other elements via a system interface or bus; (2) a display device/input device; (3) memory including both ROM and RAM; (4) a storage device; and (5) a network interface. These architectures are provided for exemplary purposes only and are not limiting to the various embodiments. The term "computing device" is used generically to refer to any computer, computing device, desktop, notebook or laptop, distributed system, server, gateway, switch, or other processing device adapted to perform the functions described herein.

c. Interest Driven Platform

In various embodiments, the community interest network is developed on a societal relationship platform. That is, the platform is based on a collection of online, virtualized social communities oriented around interests (e.g., INTS). In general, an interest may be defined broadly or narrowly in various embodiments. Further, an interest may relate to a particular interest, a hobby, or a past-time users have and/or are involved in. For instance, an interest may be defined broadly, such as education, recreation, sports, dining, business, and community, or more narrowly, such as cheerleading, pizza, or non-profits. In various embodiments, interests may be considered subcategories of other interests. For instance, cheerleading may be considered a subcategory of sports.

As is described in greater detail below, each of the virtualized communities provides users with various content items via an interface (e.g., one or more web pages). Such as, for instance, the interface may provide information, social tools, applications, and/or directories. In various embodiments, the interface allows users to switch between interests without leaving a primary interface page. Further, each interest allows users to change the scope of a community based on a tier structure (e.g., tier classification). For example, in particular embodiments with a geographic focus, each interest allows users to change from the intimacy of a local neighborhood to the breadth of a nation and/or the world. Thus, in various embodiments, the focus of the network is the interface that is tailored to a particular user's interests.

Further, in particular embodiments, each entity (e.g., users, groups, and organizations) and interest is provided with an account in the network. As described in greater detail below, each account is provided with functionality (e.g., social tools, applications, and services) associated with the interface. Thus, in these particular embodiments, the platform includes accounts for interests, individual users, groups, and organizations that are represented by a unique code in the network (e.g., an INTCODE saved in the data storage that makes up the network). In addition, in particular embodiments, the one or more interest accounts set up for each interest in the network are "system created." That is, these accounts are typically created by one or more network operators (e.g., administrators) and are not created by users of the network. Therefore, these accounts are considered fixed and finite.

d. Accounts

In various embodiments, the interest accounts associated with a particular interest are tiered to facilitate navigation and to give structure within the network. For example, in one embodiment, the tier structure (e.g., tier classification) is based on geographic location. Therefore, in this particular embodiment, each interest account is tied to a specific geographic location. Thus, the geographic locations are subordinate to other geographic locations. For instance, the tier structure may be set up as national, regional, metro, and local, with each tier being subordinate to the previous tier, respectively. Further, in various embodiments, an interest account may be linked to multiple secondary interests to facilitate navigation among the interests within the network.

Users accounts are accounts associated with a particular user of the network. Thus, in various embodiments, a user is required to set up an account to become a "member" of the network. In particular embodiments, the user creates a personal interest page upon registration with the network. This page may include such applications and social tools as a calendar, a personal blog, discussion board, events, and media drawer. In various embodiments, the user identifies his or her interests on the page and is given complete control of the page and may share specific data with defined users and groups and invite others to join groups. Further, in various embodiments, the user has the ability to manage access that users and groups have to personal data. Thus, in various embodiments, the user's personal interest page becomes a resource of the user's interests, activities, events, and happenings in the user's life. In various embodiments, the data associated with the user's account and personal interest page are saved within the network (e.g., within user storage 207 (e.g., database) in the node structure depicted in FIG. 2).

In various embodiments, group accounts are accounts that represent a group of users with common interests and typically represent a subdivision of the users with the common interests (e.g., the subdivision is based on the tier structure for the interests). For instance, a user may form a group under the interest of cheerleading that includes users with an interest in cheerleading that live in the particular user's community. In various embodiments, this user is provided with the role (e.g., the ability) to add and remove users from the group. Thus, in particular embodiments, users of the network become "members" of various groups affiliated with their interests. For example, a user may identify tennis as an interest and may become a member of a local tennis team group, a metro tennis facility board group, a regional fan of a university tennis team group, a group of season ticket holders for the U.S. Open, and a fan club group for the user's favorite player. Further, in various embodiments, each of these groups has its own associated page with calendars, blogs, discussion boards, events, and media. In addition, as is described in further detail below, each group controls what information is shared with the public (e.g., all users of the network) and what information is shared with particular users (e.g., members of the group). In various embodiments, the data associated with the groups' accounts and personal interest pages are saved within the network (e.g., within group storage 206 (e.g., database) in the node structure depicted in FIG. 2).

In particular embodiments, these group accounts may be divided into different types of accounts. For instance, various embodiments may include interest group accounts, project group accounts, and/or event group accounts. An interest group account may be based jointly around general interests. Further, the interest group account may be based on a tier classification such as locality as defined by the physical location of users. A project account is an account created by one or more groups (e.g., group owners) to provide an entity corresponding to a common cause or project. An event account is a group account created to represent a particular event to broaden its reach and build collateral information around the event (e.g., blog, media drawer, etc.).

Further, in various embodiments, the group accounts may include family accounts that are specially moderated group accounts that only provide access to users (e.g., members) of the same family. For instance, within this group, family members share activities and experiences with fellow family members. Further, an interface (e.g., pages) provided for such a group may reflect all possible family configurations. For example, one family page may be Carter, an expanded page may be Carter/Wallace to reflect the close ties of a user's sister's husband's family, an extended page may be Reynolds/Carter Clan relative to the family tree, and a "Carter fan page" for friends and family to following what is happening with the family. In particular embodiments, these group accounts are physically linked within the network by associating the INTCODE for each group account in group storage 206 (e.g., database). Thus, an advantage of such accounts in various embodiments is the ability to have a shared family communication hub (e.g., family account). As a result, family members are not required to use multiple communication channels (such as multiple emails) to communicate family experiences.

Finally, in various embodiments, the user and/or group accounts may include businesses accounts that represent businesses. These businesses may range from international, national, regional, to local businesses. Similar to users, in various embodiments, business accounts are provided with a page and the same applications and social tools that allow a business to interact and interwork with users on the network. As is described in greater detail below, with these abilities, businesses are able to create groups, send out specific information to users and/or groups, and provide invitations to groups based on such criteria as loyalty, affiliations, or demographics.

Further, in various embodiments, the network includes organization accounts that are accounts that represent one or more groups. In particular embodiments, the group that is the "founder" of the organization is provided with the role (e.g., the ability) to add and remove groups from the organization. Further, in various embodiments, an organization is formed by a group (e.g., parent group) including another group (child group) as a member. Thus, the parent group becomes an organization upon accepting the child group as a member.

For example, the Girl Scouts organization is a very large group of people loosely connected by a leadership structure of troops to regional groups and finally to a national leadership structure. Thus, a group account (e.g., Girl Scouts International) can be initially created for the Girl Scouts organization. Other groups (and corresponding accounts) may be formed and may request to become members of the Girl Scouts International group. For instance, a group representing the United States Girl Scouts may request to become a member of the Girl Scouts International group. Once the Girl Scouts International group includes the United States Girl Scout group as a member, the Girl Scouts International group is converted to an organization. In this particular example, other groups may be formed that include a group representing the Southwest Girl Scout Region, a group representing Austin Girl Scout District, and a group representing Town Lake GS Troop 601. In turn, these groups may or may not become members of other groups (in turn, converting the other groups to organizations).

Such a structure in various embodiments enables organizations to easily network and disseminate information to specific groups, tiers, and/or to unique groups in various embodiments. Further, similar to group accounts, organization accounts in various embodiments have control over what information associated with the account is made public and what information is made private.

e. Interest Directory Structure

Figure 4:
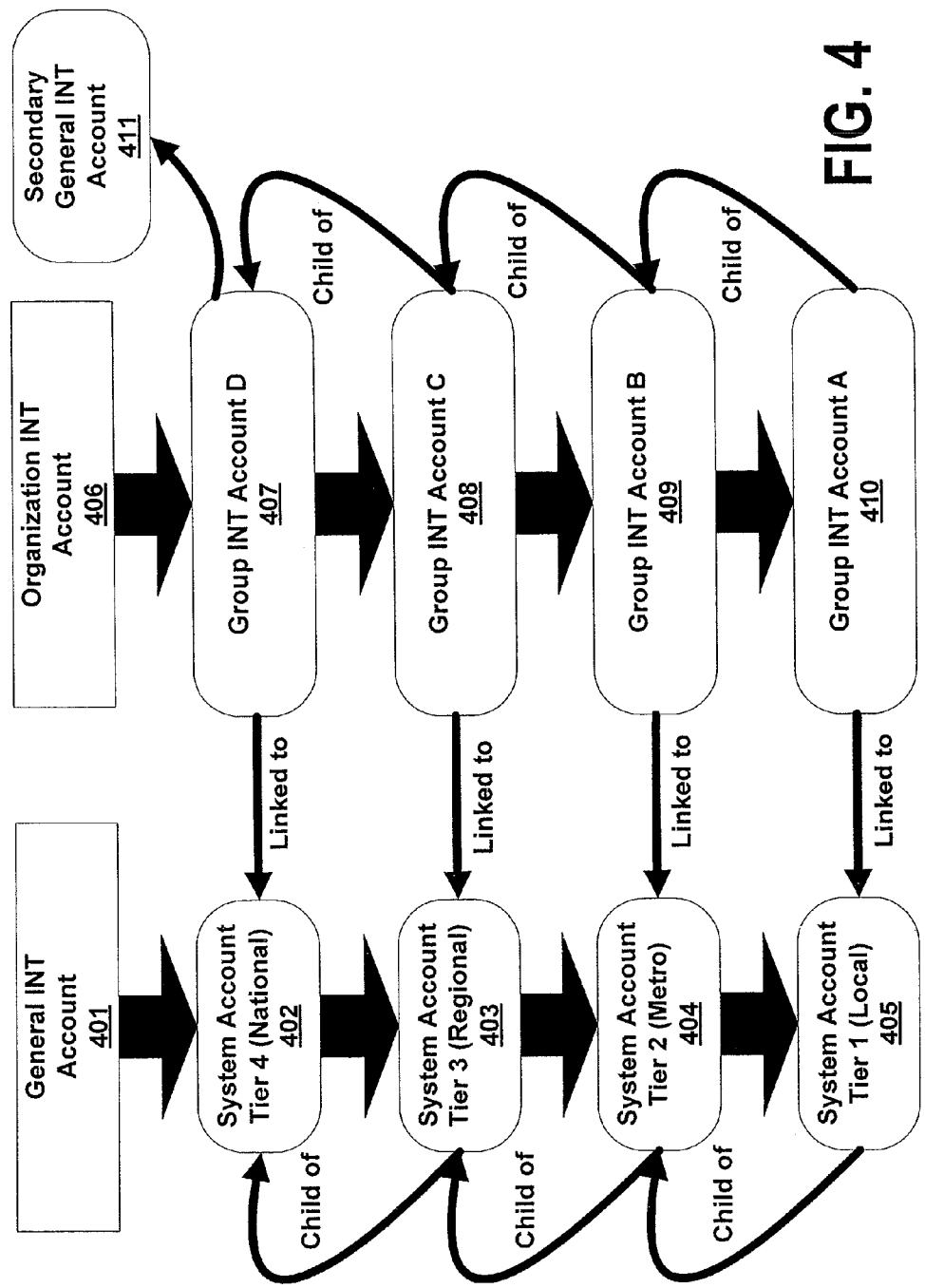
FIG. 4 shows an interest directory structure according to one embodiment of the invention.

As previously discussed, the community interest network is based on a collection of online, virtualized social communities oriented around interests (e.g., INTS). Thus, FIG. 4 provides an embodiment of a directory structure based on a particular interest defined within the community interest network. In particular embodiments, for example, the directory structure is represented by data on the structure stored in the system storage 204 (e.g., database) depicted in FIG. 2. The directory structure shown in FIG. 4 is hierarchical and is built on a number of interest accounts tied to a specific tier structure (e.g., tier classification). For instance, the directory structure may include a general interest account 401 that is located at the top of the hierarchy (e.g., tier structure). This account 401 may represent a general interest such as swimming. The next level in the hierarchy may include an interest account 402 that is tied to a tier in the hierarchy that is below the tier tied to the general interest account 401. For instance, in FIG. 4, the interest account 402 is tied to Tier 4 (e.g., national). Thus, the "national" interest account 402 is considered a child account of the general interest account 401. This structure continues until an account is included for each level of the tier that is desired to be included in the community interest network. For instance, FIG. 4 includes a "regional" interest account 403, a "metro" interest account 404, and a "local" interest account 405. Thus, each of the interest accounts 402, 403, 404, 405 is tied to a tier in the hierarchy. As a result, the "regional" interest account 403 is a child of the "national" interest account 402, the "metro" interest account 404 is a child of the "regional" interest account 403 (and is a child of the "national" interest account 402), and the "local" interest account 405 is a child of the "metro" regional account 404 (and is a child of the "regional" interest account 403 and the "national" interest account 402).

It should be understood by those of ordinary skill in the art that the tier structure may be based on any number of criteria according to various embodiments. For instance, in one embodiment, the tier structure may be based on geographic location (e.g., national, regional, metro, and local). While in another embodiment, the tier structure may be based on an organizational structure (e.g., general, colonel, captain, sergeant, and private). However, for purposes of this disclosure, geographic location will be used as the tier structure in the remainder of the description. However, it should be understood that this particular tier structure is not limiting to the scope of the claimed invention.

Further, it should be understood that in various embodiments the directory structure for any particular interest may include multiple accounts that are children of a single account. For instance, the directory structure displayed in FIG. 4 may include more than one "national" account 402 that are children of the general interest account 401. For example, the directory structure may include a "national" interest account 402 for the United States and a "national" interest account 402 for England. In addition, these two "national" interest accounts 402 may include more than one "regional" interest account 403 that are children. For example, the "United States national" interest account 402 may have as children an "Eastern regional" interest account 403, a "Southern regional" interest account 403, a "Midwestern regional" account 403, and a "Western regional" interest account 403.

As previous described, in particular embodiments, individual users set up group accounts based on one or more interests. As is described in greater detail below, a user identifies a primary interest that is associated with a group at the time the user creates the group (e.g., group accounts). Thus, in FIG. 4, one or more individual users may set up groups and identify the interest associated with the general account 401 as the primary interest for the groups. Further, the one or more individual users may link the groups to levels within the tier structure. For instance, in FIG. 4, an individual user has created a group account (which has been converted to an organization account 406) and has identified the interested tied to the general interest account 401 as the primary interest for the organization account 406. In addition, the same user, or a different user, has created a group account 407 (Group Int Account D) and has linked the account to the interest tied to the general interest account as the primary interest for the group account 407. Further, the user has also linked the account 407 to the "national" tier level in the hierarchy. In similar fashion, the user, or different users, has constructed Group Int Account C 408, Group Int Account B 409, and Group Int Account A 410. Therefore in FIG. 4, Group Int Account A 410 is linked to the "local" tier and as a result is a child of Group Int Account B 409. In similar fashion, Group Int Account B 409 is linked to the "metro" tier and as a result is a child of Group Int Account C 408. Thus, the result is a group account directory within the network that users can navigate based on their identified interests and the defined tier structure.

III. Exemplary System Operation

Figure 5:
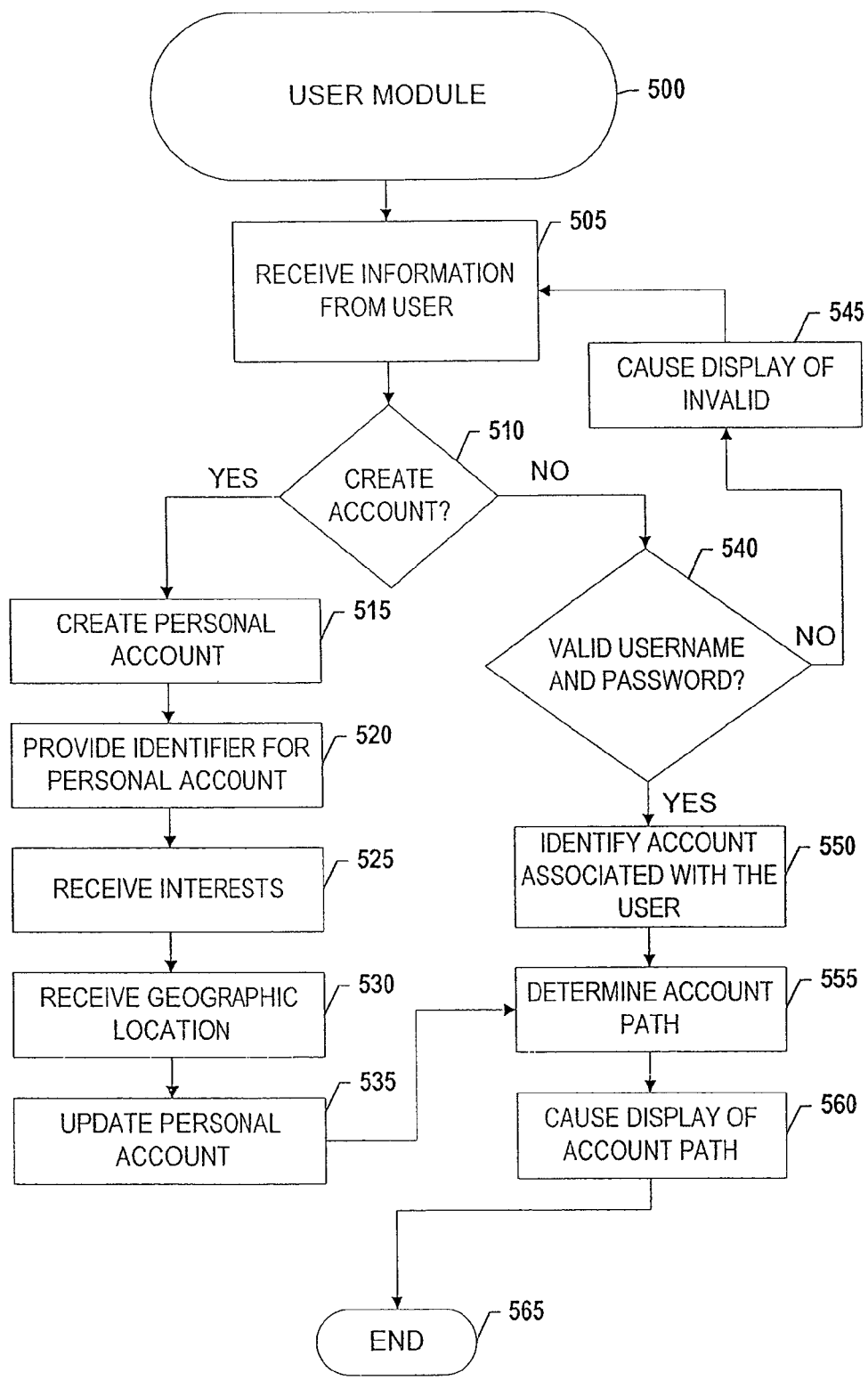
FIG. 5 shows a flow diagram of a user module according to one embodiment of the invention.
Figure 6:
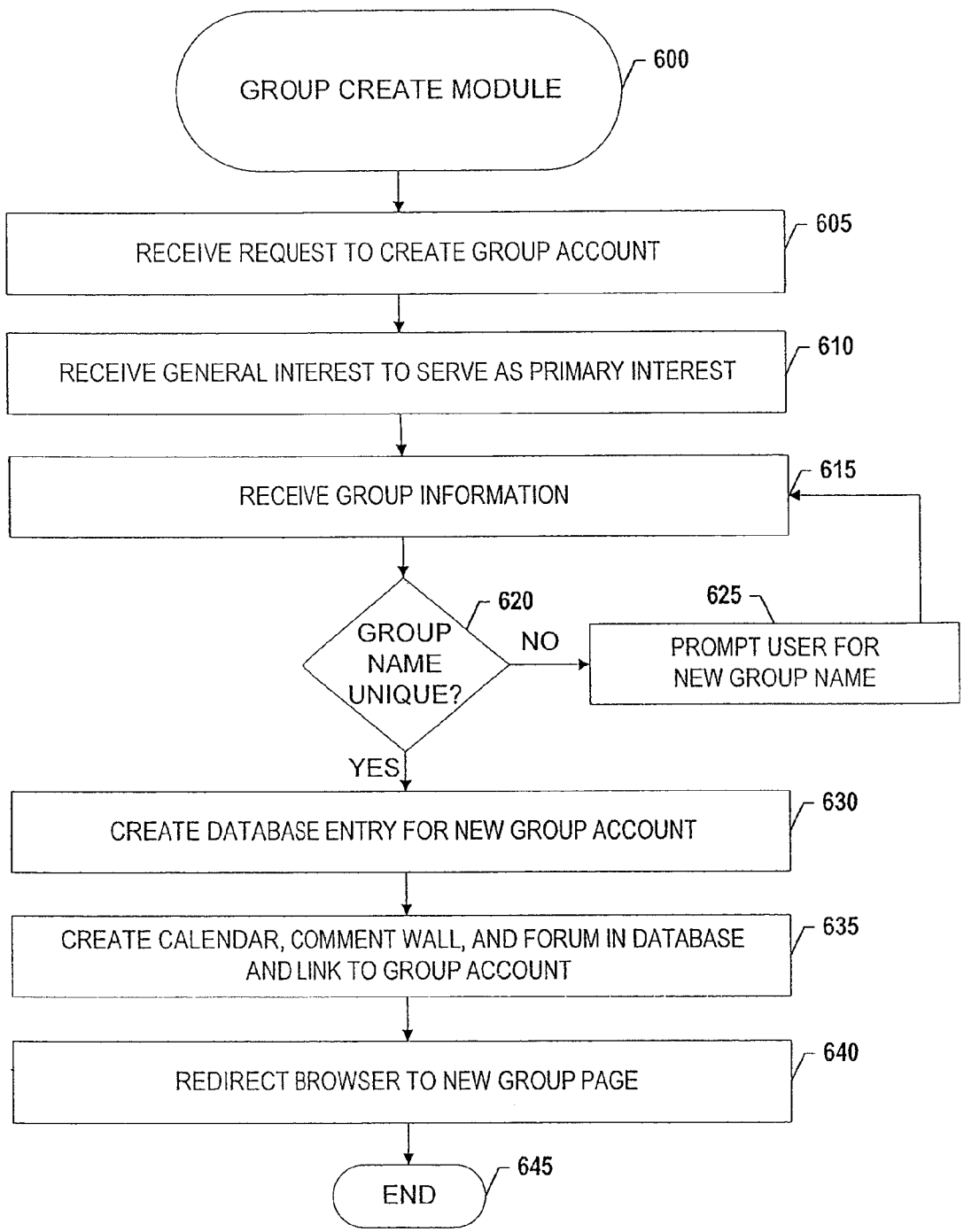
FIG. 6 shows a flow diagram of a create group module according to one embodiment of the invention.
Figure 7:
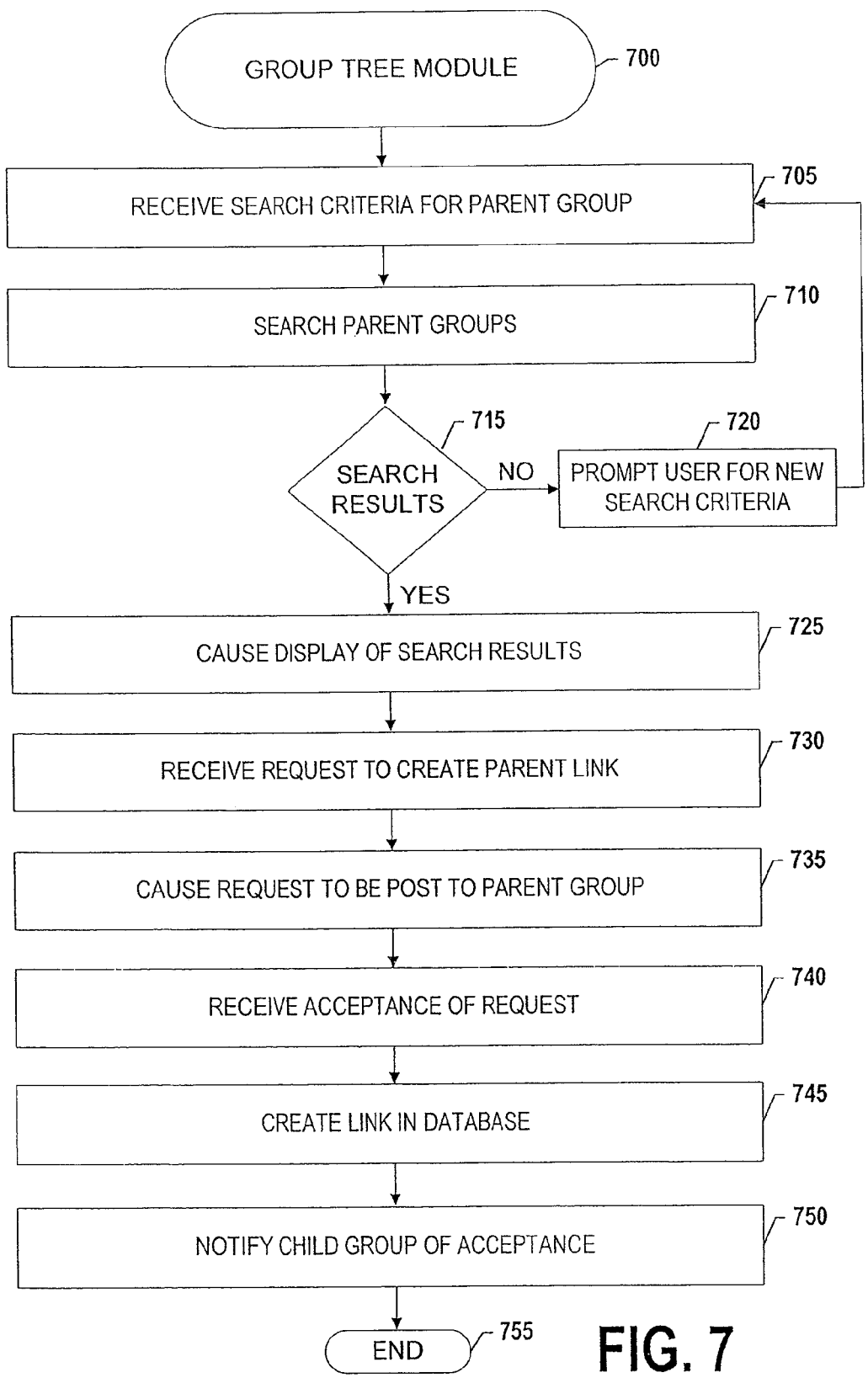
FIG. 7 shows a flow diagram of a group tree module according to one embodiment of the invention.

As noted above, various embodiments of the present invention provide systems and methods for providing a community interest network. Reference will now be made to FIGS. 5-7 which illustrate operations and processes as produced by these various embodiments. For instance, FIG. 5 provides a flow diagram of a user module 500 that registers users with the community interest network and logs users onto the community interest network according to various embodiments. FIG. 6 provides a flow diagram of a group create module 600 that creates groups within the community interest network according to various embodiments. Further, FIG. 7 provides a flow diagram of a group tree module 700 that builds the directory structure of the groups within the community interest network according to various embodiments. These modules 500, 600, 700 are described in greater detail below.

a. User Module

As previously discussed, in various embodiments, the application server 203 may include a user module 500 that is adapted to register users with the community interest network and log users onto the community interest network. A user may access the module 500 in various ways according to embodiments. For instance, in one embodiment, the user accesses the module 500 directly on the application server 203. The user may be using a computing device 210a, 210b, 210c that is in communication with the application server 203 over one or more networks 105 and the user accesses the module 500 directly over the networks 105. In another embodiment, the user may access the user module 500 through one or more web pages. For instance, a web server 202 may be in communication with the application server 203 and may provide a web site on the Internet 105 (as shown in the node structure 101 depicted in FIG. 2). Thus, the user visits the web site over the Internet 105 and interacts with the user module 500 by accessing the module 500 through the web site. That is, in various embodiments, the web server 202 provides an interface (e.g., one or more web pages) that is configured to allow the user to interact with the user module 500 residing on the application server 203.

Accordingly, FIG. 5 illustrates a flow diagram of the user module 500 according to various embodiments. This flow diagram may correspond to the steps carried out by the processor 305 in the application server 203 shown in FIG. 3 as it executes the module 500 in the server's RAM memory 367 according to various embodiments.

In various embodiments, the user visits a web site associated with the community interest network. In particular embodiments, the web site provides an initial page (e.g., "home" page) in which the user can indicate that he or she is interested in registering with the community interest network. For example, the initial page may provide two buttons (e.g., links) on the page. The first button indicates "Log In" and is selected by a user who has already registered with the network. The second button indicates "Sign Up" and is selected by the user in order to register with the network. Thus, the user selects the "Sign Up" button on the web page. In response, the web site directs the user to one or more pages that request the user to enter information. For example, in one embodiment, a web page may request the user to enter the user's email address, a password, and a username. The user types in the information and selects the "Submit" button. In response, the web server 202 sends a request and/or the information to the application server 203.

Thus, in Step 505, the user module 500 receives the information. In Step 510, the user module 500 determines whether or not to create a user account for the user. For instance, in one embodiment, the web server 202 sends a request to create an account along with the information received from the user. In another embodiment, the user module 500 simply determines whether a user identifier (e.g., username and password) was received along with the information from the web server 202.

If a user identifier has not been received, the user module 500 determines that the user is new and an account needs to be created for the user.

In response to determining that an account is to be created for the user, the user module 500 creates a personal account for the user, shown as Step 515. In various embodiments, this entails the user module 500 creating a unique identifier for the user that represents the account and storing the identifier and the information received from the user in some type of storage medium. For instance, in particular embodiments, the user module 500 stores the identifier and the information in a database (e.g., user database) residing on the storage medium 207 depicted in the node structure shown in FIG. 2.

Once the identifier and information is saved for the user, the user module 500 provides the identifier to the web server 202, shown as Step 520. In response, in various embodiments, the web server 202 provides the user with one or more "setup" web pages. In particular embodiments, these web pages allow the user to select one or more interests that are defined within the community interest network as interests to be associated with the particular user (e.g., allows the user to subscribe to one or more interests). For instance, in one embodiment, the user is provided with a list of general interest and the user can select one or more interests from the list. Further, in particular embodiments, the user is asked to enter a geographic location for where the user wants to be associated within the network (or, in other embodiments for example, position in an organization chart). For example, a web page may request that the user to enter his or her residential address, zip code, and/or telephone number.

Once the user has entered the list of interests and geographic location, the web server 202 sends the information to the application server 203. As a result, in Steps 525 and 530, the user module 500 receives the interests and the geographic location associated with the user. In response, the user module 500 updates the user's personal account with this information in the database, shown as Step 535. In particular embodiments, the user module 500 then determines the account path for the particular user's account, shown as Step 555. That is, in these particular embodiments, the user module 500 identifies the users, groups, and/or organizations that are also associated with the interests selected by the user. Further, in Step 560, the user module 500 sends the account path information to the web server 202 to cause the account path to be displayed for the user. Thus, the web server 202 receives the account path and configures a personal interest page to display to the user that provides links and search mechanism so that the user can view the various users, groups, and organizations associated with the user's selected interests. In response, the user can view and/or search these various users, groups, and organizations and submit request to add users as friends and to join groups and/or organizations.

In the alternative, if the user is already registered with the community interest network, the user selects the "Log In" button on the initial web page and the web server 202 sends a web page to the user's browser asking the user to enter a user identifier, such as a username and password for example. The user enters a username and password and the web server 202 sends the username and password to the user module 500. Thus, returning to Step 505, the user module 500 receives the username and password and, in Step 510, determines that an account does not need to be created for the user.

In Step 540, the user module 500 determines whether the user has entered a valid username and password. Thus, in particular embodiments, the user module 500 queries the user database for the password associated with the username entered by the user. If the username is not found or if the password entered by the user does not match the password stored in the database for the user, the user module 500 causes a display that alerts the user that the username and/or password is invalid, shown as Step 545. For instance, the user module 500 sends the web server 202 a message indicating the username and/or password is invalid. In response, the web server 202 provides a web page to display a message to the user informing him or her that the entered username and password are invalid and to please reenter a valid username and password.

If the user module 500 does determine the user has entered a valid username and password, the user module 500 identifies an account associated with the particular user, shown as Step 550. This entails the user module 500 in particular embodiments querying the user database for the account associated with the username entered by the user. Once the user module 500 has identified the user's account, the user module 500 determines the account path, shown as Step 555. Thus, as previously described, the user module 500 identifies the users, groups, and/or organizations that are also associated with the interests selected by the user. Further, the user module 500 identifies the users, groups, and/or organizations the user has established relationships with. That is, in various embodiments, the user module 500 references information stored in the various storage media of the network (e.g., databases) to determine what links exist in the network for the user. For example, the user module 500 identifies users who are "friends" of the particular user and groups and/or organizations the user is a member of.

Continuing, in Step 560, the user module 500 sends the account path information over the network 205 to the web server 202 to cause the account path to be displayed for the user. Thus, the web server 202 receives the account path and configures the user's personal interest page to display to the user that provides links and search mechanisms so that the user can view the various users, groups, and organizations, as well as provide links to users, groups, and organizations that the user has already established relationships with. For example, the web server 202 customizes a template personal web page based on the account path information to include the links for the user. In response, the user can view, search, and/or link to these various users, groups, and organizations.

b. Group Create Module

In various embodiments, the application server 203 may also include a group create module 600 that is adapted to create groups within the community interest network. Similar to the user module 500, the user may access this module 600 directly on the application server 110 or through one or more web pages via the web server 202. For instance, in particular embodiments, the user visits a web site over the Internet 105 and interacts with the group create module 600 by accessing the module 600 through the web site. That is, in various embodiments, the web server 202 provides an interface (e.g., one or more web pages) that is configured to allow the user to interact with the group create module 600 residing on the application server 203. It should be noted that, in various embodiments, the web site may be the same web site associated with the user module 500 (and group tree module 700), while in other embodiments the web site may be a different web site. Further, in various embodiments, the user module 500, group tree module 700, and/or the group create module 600 may be associated with more than one web site. Thus, in these particular embodiments, the modules 500, 600, 700 may service more than one web server 202 and/or reside on more than one application server 203.

Accordingly, FIG. 6 illustrates a flow diagram of the group create module 600 according to various embodiments. This flow diagram may correspond to the steps carried out by the processor 305 in the application server 203 shown in FIG. 3 as it executes the module 600 in the server's RAM memory 367 according to various embodiments.

In various embodiments, the user logs into the community interest network (as described above) and is presented with his or her personal interest page. As previously described, the user's personal interest page includes various mechanisms to allow the user to view users, groups, and/or organizations associated with the interests the user has identified. For instance, in particular embodiments, the user may navigate to a particular interest's home page. (As previously described, a general interest is provided with an account in the community interest network and the web server 202 provides a home web page for this particular interest account.) In various embodiments, the interest's home page provides a button (e.g., "Create Group" button) a user can select that allows the user to create a group associated with the particular interest.

For example, a user logs onto the community interest network and navigates to the home page for the interest "recreation." The user views the groups associated with the particular interest and sees that a group does not exist for runners in the user's hometown of Staunton, Va. The user decides to create a "running" group under this interest and selects the "Create Group" button. In response, the web server 202 sends a request to the group create module 600 and the module 600 receives the request, shown as Step 605.

Further, in various embodiments, the web server 202 also sends an indicator of the general interest that is linked with the group to be created. As previously described, in particular embodiments, each group is linked with a primary interest. Therefore, in this example, the primary interest for the group to be created is "recreation." Thus, in Step 610, the group create module 600 receives the indicator indicating the general interest "recreation." It should be noted that in various embodiments the user may also identify one or more secondary interest associated with the group. For instance, in the example, the user may also identify the interest "wellness" as a secondary interest to be linked to the "running" group. In these particular embodiments, such links provide a mechanism for users searching under other interests besides the primary interest to find the group.

Next, the web server 202 provides one or more web pages that are displayed on the user's browser and request information on the group. For example, the user may be requested to provide a name for the group, a description of the group, and whether the group is private or public. Further, the user may also provide information as to where the group fits into the tier structure of the network. For instance, in this example, the user wishes to create a "running" group for his or her hometown of Staunton, Va. Therefore, the user provides some type of information that identifies this geographic location, such as the name of the city and/or a zip code for the city. Once the user has completed entering the information on the one or more web pages, the web server 202 sends the information to the group create module 600, shown as Step 615.

In particular embodiments, the group create module 600 determines whether the group name provided by the user is unique, shown as Step 620. According to various embodiments, the level of uniqueness that is required in the network may differ. For example, in one embodiment, the group name must be unique with respect to the entire community interest network. In another embodiment, the group name may only need to be unique with respect to the primary interest linked to the group. Therefore, the group create module 600 queries the groups that exist in the network based on the name provided by the user.

If any records are returned as a result of the query, the group create module 600 prompts the user for a new group name, shown as Step 625. For instance, the group create module 600 sends a message to the web server 202 that the name provided by the user is not unique. In response, the web server 202 posts a message to the user informing the user that the name he or she has provided is not unique and to provide a new name. Once the user has entered a new name, the web server 202 sends the new name to the group create module 600 and the module 600 checks the new name.

If no records are returned as a result of the query, the group create module 600 creates a database entry for the new group (e.g., creates a new group account), shown as Step 630. Similar to a new user account, in various embodiments, the group create module 600 creates a unique identifier for the account that is saved along with the information on the group in the database. Further, in various embodiments, the group create module 600 creates various tools and/or applications for the new group, shown as Step 635. For example, the group create module 600 creates a calendar, a comment wall, and a forum for the group and links each to the group account.

Finally, in Step 640, the group create module 600 redirects the user's browser to the group page for the new group. Similar to a user's personal interest page, each group is provided with a group page. This group page is populated with the various content items (e.g., information, social tools and/or applications) linked to the particular group. Thus, in the example, the group create module 600 sends a message to the web server 202 along with information on the group page. In response, the web server 202 constructs the group page based on the information so that the group page is displayed on the user's browser along with the content items, such as the calendar, comment wall, and forum.

For example, in one embodiment, the group create module 600 may send the information to populate the calendar along with the message to the web server 202. In this particular example, the web server 202 simply constructs the calendar for the web page using a calendar template and the information. In another embodiment, the group create module 600 may instead send an identifier that may be used by the web server 202 to locate the information for the calendar in the database. Therefore, in this particular embodiment, the web server 202 queries the information from the database using the identifier and constructs the calendar using the template and queried information. As a result, the user is presented with the group page on his or her browser.

In various embodiments, the user who creates a group (e.g., group owner) is provided with administrative rights for that particular group. For example, the group owner is provided with such rights as to accept request submitted by users to become a member of the group. Further, in various embodiments, the group owner is provided with the ability to delegate responsibilities for the group to other users of the network (e.g., assign roles by "tagging" a user). In addition, in various embodiments, the group owner can control what content is viewable and the ability to share information within the group and/or the availability of a social tool and/or an application on the group's page by "tagging" a user with specific roles.

For instance, the group owner may delegate to a member of the group the responsibility to add or remote events from the group's calendar. Therefore, in this particular embodiment, once the user has been granted the privilege to update the calendar, the next time the user links to the group account the user has a different set of functions (e.g., privileges) available to his or her compared to other members of the group. Thus, in various embodiments, a particular user may have different roles with different group accounts. Therefore, as the user changes from a first group's page to a second group's page, the second group account dictates what abilities and features are available to the user on the second group's home page based on the roles (e.g., tags) delegated to the user by the owner of the second group.

c. Group Tree Module

In various embodiments, the application server 203 may also include a group tree module 700 that is adapted to create links (e.g., save information representing links within the storage media of the network) among groups within the community interest network. Accordingly, FIG. 7 illustrates a flow diagram of the group tree module 700 according to various embodiments. This flow diagram may correspond to the steps carried out by the processor 305 in the application server 203 shown in FIG. 3 as it executes the module 700 in the server's RAM memory 367 according to various embodiments.

As previously described, organizations are created in the community interest network as a result of a group accepting another group as a member (e.g., the owner of a first group accepting the request from the owner of a second group to become a member of the first group). Therefore, in various embodiments, the owner of a group logs into the network and navigates to a tree tab (e.g., a web page) that provides a search mechanism for searching groups that exist in the network. For instance, the tab may allow the owner to type in search criteria to search for particular groups associated with one or more interests and/or one or more tiers (e.g., geographic locations). For example, the owner of the "running" group associated with Staunton, Va. described above types in the interest "recreation" and the geographic location "Virginia." Thus, the web server 202 sends the search criteria over the network 205 where it is received by the group tree module 700 residing on the application server, shown as Step 705.

In response, in Step 710, the group tree module 700 searches the groups that exist in the community interest network to identify groups based on the search criteria. For instance, in one embodiment, the group tree module 700 searches the group database that resides on the storage medium 206 depicted in FIG. 2 to identify groups based on the search criteria. Therefore, in the example, the group tree module 700 searches the group database to identify any groups that exist in the community interest network that are associated with (e.g., linked to) the interest "recreation" and the geographic location "Staunton, Va."

In Step 715, if the group tree module 700 determines that the search criteria failed to return any results, the module 700 sends a message to the web server 202 to inform the owner that no search results were found and to prompt the owner to enter and/or edit his or her search criteria, shown as Step 720. However, in Step 715, if the group tree module 700 determines that the search criteria did return search results, the module 700 causes the search results to be displayed to the owner, shown as Step 725. In one embodiment, this may entail the group tree module 700 sending the search results over the network 205 to the web server 202 and the web server constructing one or more web pages that are displayed on the owner's browser and list the search results. For instance, returning to the example, the owner is presented with list of search results on a web page that include such groups as: (1) the Virginia running group, (2) the Shenandoah Valley running group, and (3) the fitness group of Staunton.

The owner reviews the search results and decides that he or she would like to request the owner's group to become a member of a particular group listed in the search results. For example, the owner of the Staunton Running group decides that he or she would like to request that the group become a member of the Shenandoah Valley running group. Thus, the owner selects a link on the web page associated with the Shenandoah Valley running group to request membership and the web server 202 sends the request over the network 205 where it is received by the group tree module 700 residing on the application server 203, shown as Step 730.

In response, in Step 735, the group tree module 700 causes the request to be posted to the parent group (e.g., to the Shenandoah Valley running group). For instance, in one embodiment, the group tree module 700 posts a message along with the request and a link on the Shenandoah Valley running group's page. Thus, the owner of the Shenandoah Valley running group visits the group's page and reads the posted message. The owner may then decide whether he or she would like to make the Staunton running group a member of the Shenandoah Valley running group. If owner does agree to make the Staunton running group a member, the owner selects the link in the message. As a result, the web server 202 sends an acceptance of the request over the network 202 where it is received by the group tree module 700 residing on the application server 203, shown as Step 740.

In response, the group tree module 700 creates a link in the group database that identifies the relationship between the Staunton running group and the Shenandoah Valley running group. In this particular example, the link further identifies that the Staunton running group is a child (e.g., member) of the Shenandoah Valley running group.

Once the link has been created, the group tree module 700 notifies the child group (e.g., the Staunton running group) that the request to become a member of the Shenandoah Valley running group has been accepted. In particular embodiments, the Shenandoah Valley running group may be converted into an organization within the network as a result of the Staunton running group becoming a member. In addition, members of the Staunton running group may now visit the Shenandoah Valley running group page and be provided with various functions (e.g., privileges) on the page depending on the role assigned to the Staunton running group.

Further, in various embodiments, information posted on the Shenandoah Valley running group may be propagated down (e.g., may be cascaded down) to the Staunton running group and/or members of the Staunton running group. For instance, an event may be posted on the calendar for the Shenandoah Valley running group advertising an upcoming morning run at a national park around Charlottesville, Va. In response, the network propagates the event so it is also posted on the calendar for the Staunton running group. Therefore, members who visit the Staunton running group's page can also view this event.

Finally, in various embodiments, as a result of the parent/child link that has been established between the Shenandoah Valley running group and the Staunton running group, members who visit either groups' page can view that the relationship has been established between these two groups. Thus, a member of the Shenandoah Valley running group can visit the group's page and discover that a running group also exists for the city of Staunton. The user may then visit the Staunton running group's page and/or may request to become a member.

It should be understood by those of ordinary skill in the art that the above logic described with regard to the group tree module 700 may also apply with respect to users in various embodiments. For instance, instead of an owner of a group submitting a request to have the group become a member of another group, a user may submit a request to become a member of a group. Further, in various embodiments, a user may submit a request to become a "friend" of another user. In these instances, the group tree module 700 follows the same or similar logic as described above.

d. Additional Comments

It should be understood that the functionality of various modules 500, 600, 700 described above may be combined or separated in particular embodiments. For instance, in various embodiments, the functionality as described above with respect to the group create module 600 and the group tree module 700 may be combined into one module or separated into multiple modules. Therefore, the descriptions of the various modules 500, 600, 700 are provided above as they relate to the functionality performed by various embodiments of the invention and should not be construed to limit the scope of the claimed invention.

III. Exemplary Interfaces

As previously described, in various embodiments, a user of the community interest network navigates to different web pages (e.g., personal interest pages and/or group pages) based on relationships the user has established via interests and/or links to particular users and groups. In particular embodiments, the user is provided with an interface that is modular in nature. That is, in these particular embodiments, the interface is a logical container as presented by one or more web pages. In various embodiments, the interface may include several logical modules that make up the building blocks of the one or more web pages. These modules may be specialized applications, social tools, and/or display panels (e.g., content items) focused around the type of content that is contained within them. Thus, in particular embodiments, these modules may be represented on the screen by various tabs and the user selects a module by clicking on the corresponding tab.

Figure 8:
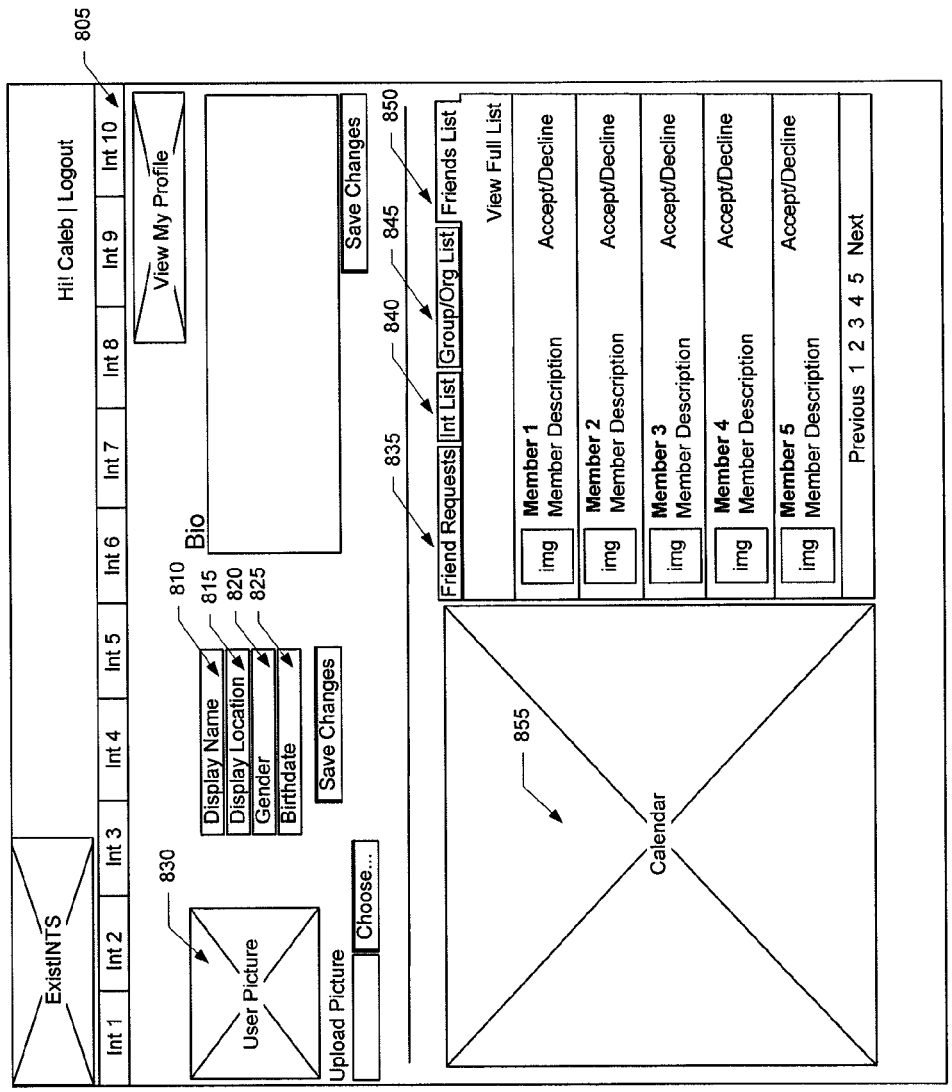
FIG. 8 shows a user's personal interest page according to one embodiment of the invention.

For instance, shown in FIG. 8 is an embodiment of an interface for a user's personal interest page. The interface includes a listing 805 (and corresponding links) along the top of the page of the general interests defined in the community interest network. Thus, if the user would like to visit the home page for a general interest, the user selects the corresponding link for the particular interest. Once on the interest's home page, the user may be able to view and use information, social tools, applications, and/or groups associated with the interest that have been made public (and/or private) on the interest's home page. In addition, the interface includes information on the user such as the user's username 810, location 815, gender 820, birthday 825, and user picture 830. Each of these pieces of information also has a corresponding link so that the user may edit the information. For instance, in particular embodiments, this information may be made public or private to control what information is viewable to other users who visit the user's personal interest page.

Further, the embodiment of the interface depicted in FIG. 8 includes tabs for friend requests 835, interest list 840, group/organization list 845, and friends list 850. The friend requests tab 835 allows the user to view outstanding requests the user has received from other users to become "friends." The interest list tab 840 allows the user to view, add, and edit interests linked to the user's account. The group/organization list 845 allows the user to view, add, and edit groups and organizations linked to the user's account (e.g., groups and organizations the user is or would like to be a member of). The friends tab 850 allows the user to view, add, and edit users and/or groups who are linked as "friends" with the user. From these tabs, not only can the user edit, view, and add, but in particular embodiments, the user can also select an interest, a request, a friend, and/or a group/organization and the network directs the user to the appropriate page associated with the selected interest, request, friend, and/or group/organization.

In addition, the embodiment of the interface depicted in FIG. 8 also includes a calendar application 855. As previously described, the calendar application 855 provides the user with a mechanism to allow the user to organize and plan a user's activities and events. Thus, in particular embodiments, one function of the calendar application 855 is to serve as the principal search engine for moving through events and activities associated with linked interests and/or groups/organizations. For instance, the calendar application 855 included on the user's personal interest page is broken down into two separate calendars. The first calendar (e.g., all calendar) includes any event and/or activity posted on a linked interest's calendar and/or group's/organization's calendar. For example, the user may be a member of the Staunton running group and has subscribed to receiving the events and activities added to the Staunton running group's calendar. Following the user's subscription, an activity is added the Staunton running group's calendar. This particular activity is a scheduled run for the group on Saturday, October $17^{th}$ at 9:00 a.m. As a result of this activity being added to the Staunton running group's calendar, the activity is also posted on the user's all calendar. Therefore, the next time the user logs onto the network and visits his or her personal interest page, the activity is posted on the user's all calendar so that the user can view the activity. The user can then decide whether he or she would like to attend the event.

If the user decides he or she would like to attend the activity, the user clicks on the activity to move the activity to the user's second calendar (e.g., the user's private calendar). In response, in particular embodiments, the calendar application 855 may send a RSVP message to the Staunton running group informing the group that the user has added the activity to his or her personal calendar. Further, in particular embodiments, the calendar application 855 may send the user an email and/or post a message on the user's message board reminding the user of the activity. Finally, in particular embodiments, the calendar application 855 may also check to confirm that the activity does not conflict with another activity or event already added to the user's private calendar. If such a conflict does exist, the calendar application 855 posts a message to the user informing him or her of the conflict.

As a result of having the calendar application 855, in various embodiments, the user is able to receive notice of all of the events and activities associated with interests, users, and/or groups/organizations the user is linked with. Further, in particular embodiments, the user may also post events and activities that are propagated to friends and/or linked groups/organizations and/or compare the user's personal calendar with the calendar of friends and linked groups/organizations.

Figure 9:
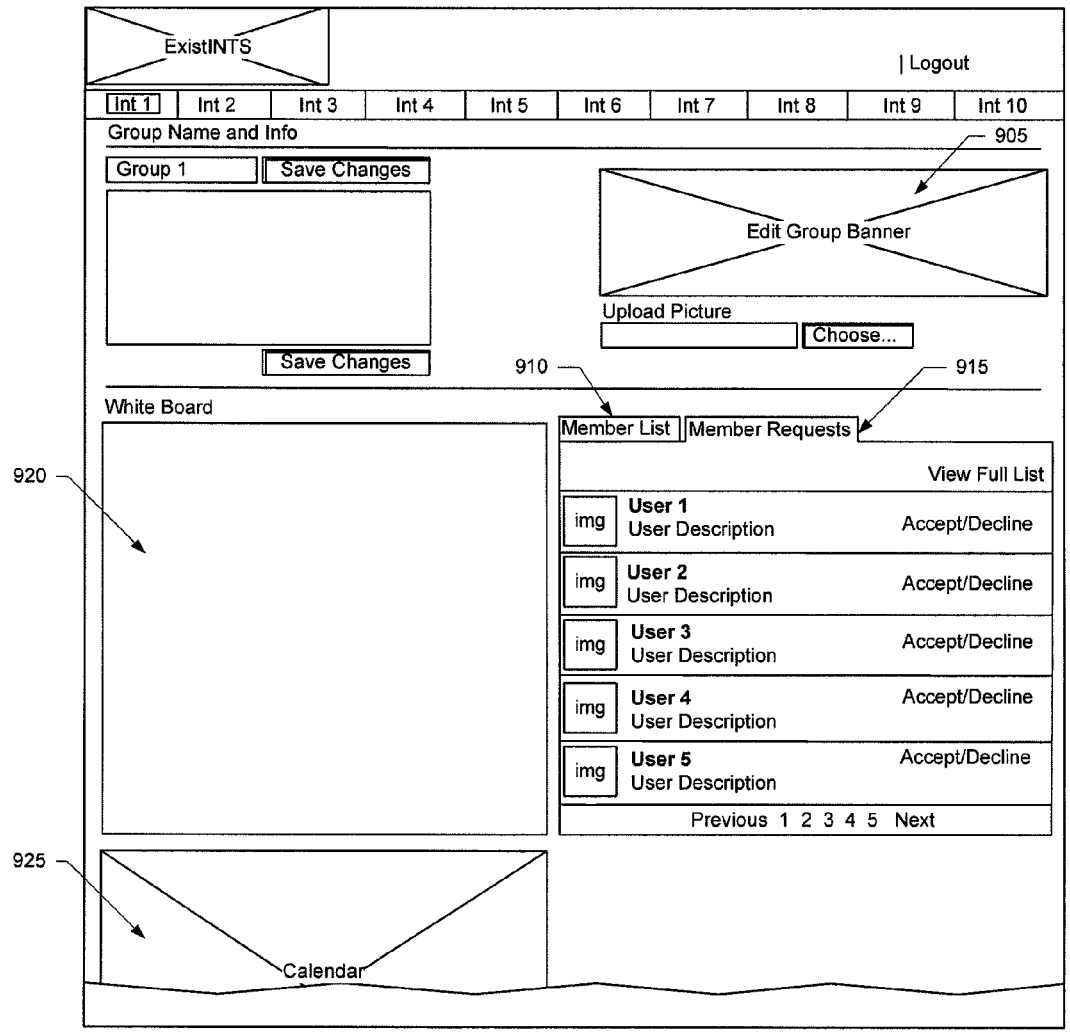
FIG. 9 shows a group page according to one embodiment of the invention.

Further, shown in FIG. 9 is an embodiment of an interface for a group/organization page. Similar to a user's personal interest page, in various embodiments, the group page includes information about the group. For instance, the group page shown in FIG. 9 includes a group banner 905 that may be edited by clicking on the banner. In addition, the group page may also include information, social tools, and/or applications that may be made available to users upon visiting the page such as a white board 920 and a calendar 925. Thus, for example, if a user has the appropriate role assigned to him or her, the user may be able to enter events and activities on the calendar that are propagated to the other members of the group. In addition, in various embodiments, the group page may include one or more tabs (similar to the user's personal interest page) such as members list 910 and member request 915. The members list tab 910 allows users with the proper role to view the users and/or groups that are members of the particular group/organization. The member requests tab 915 allows the owner of the group/organization to review and accept or deny request received by various users and/or groups to become members of the group/organization.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system providing a community interest network comprising:
memory comprising:
a hierarchical directory structure comprising one or more interest directory structures based on a tier classification, each interest directory structure comprising:
(a) a first general interest account based on a first general interest corresponding to a first tier classification and comprising a first set of one or more content items;
(b) a second general interest account based on the first general interest and corresponding to a second tier classification subordinate to the first tier classification, the second general interest account comprising a second set of one or more content items;
(c) a first group account based on a first group and comprising a first primary link to the first general interest account and a third set of one or more content items; and
(d) a second group account based on a second group and comprising a second primary link to the second general interest account and a fourth set of one or more content items, the second group being a member of the first group, wherein the second group's membership in the first group causes at least one content item of the third set of one or more content items to be associated with the fourth set of one or more content items; and
(e) one or more personal accounts associated with one or more users, each personal account identifying one or more general interests; and
one or more computer processors executing a graphical user interface, the one or more computer processors are configured to:
(a) in response to a particular user of the one or more users utilizing the graphical user interface and the graphical user interface identifying the first tier classification:
(1) access the particular user's personal account stored in the memory; and
(2) in response to the user's personal account identifying a first personal link to the first general interest, display the first set of one or more content items corresponding to the first general interest account, and
(3) in response to the user's personal account identifying a second personal link to the first group, display the third set of one or more content items corresponding to the first group account, and
(b) in response to a particular user of the one or more users utilizing the graphical user interface and the graphical user interface identifying the second tier classification:
(1) access the particular user's personal account stored in the memory; and
(2) in response to the user's personal account identifying the first personal link to the first general interest, display the second set of one or more content items corresponding to the second general interest account, and
(3) in response to the user's personal account identifying a third personal link to the second group, display the fourth set of one or more content items corresponding to the second group account.

2. The system of claim 1, wherein:
each interest directory further comprises:
(a) a third general interest account based on the first general interest and corresponding to a third tier classification subordinate to the second tier classification, the third general interest account comprising a fifth set of one or more content items; and
(b) a third group account based on a third group and comprising a third primary link to the third general interest account and a sixth set of one or more content items; and the one or more computer processors are configured to:
in response to a particular user of the one or more users utilizing the graphical user interface and the graphical user interface identifying the third tier classification:
(1) access the particular user's personal account stored in the memory; and
(2) in response to the user's personal account identifying the first personal link to the first general interest, display the fifth set of one or more content items corresponding to the third general interest account, and
(3) in response to the user's personal account identifying a fourth personal link to the third group, display the sixth set of one or more content items corresponding to the third group account.

3. The system of claim 1, wherein the tier classification is based on geographic location.

4. The system of claim 3, wherein the tier classification comprises national, regional, metro, and local, and the regional tier is subordinate to the national tier, the metro tier is subordinate to the regional tier, and the local tier is subordinate to the metro tier.

5. The system of claim 1, wherein the tier classification is based on an organizational structure.

6. The system of claim 1, wherein the one or more content items comprise information related to the corresponding account, applications related to the corresponding account, social tools related to the corresponding account, and a directory providing an aggregated view of shortcuts to one or more other accounts.

7. The system of claim 1, wherein the graphical user interface comprises a web application and the one or more computer processors executing the graphical user interface are configured to:

in response to a particular user of the one or more users utilizing the graphical user interface and the graphical user interface identifying the first tier classification:
(1) access the particular user's personal account stored in the memory; and
(2) in response to the user's personal account identifying the first personal link to the first general interest, display a first web page comprising the first set of one or more content items corresponding to the first general interest account, and
(3) in response to the user's personal account identifying the second personal link to the first group, display a second web page comprising the third set of one or more content items corresponding to the first group account.

8. The system of claim 1 wherein the one or more computer processors are configured to:
in response to a particular user of the one or more users utilizing the graphical user interface and the graphical user interface identifying the first tier classification:
(1) access the particular user's personal account stored in the memory; and
(2) in response to the user's personal account identifying the personal second link to the first group and one or more roles associated with the first group, display a subset of the second set of one or more content items based on the one or more roles.

9. A computer-implemented method of providing a community interest network, the method comprising the steps of:
(1) defining a hierarchical directory structure stored in memory comprising one or more interest directory structures based on a tier classification, each interest directory structure comprising:
(a) a first general interest account based on a first general interest corresponding to a first tier classification and comprising a first set of one or more content items;
(b) a second general interest account based on the first general interest and corresponding to a second tier classification subordinate to the first tier classification, the second general interest account comprising a second set of one or more content items;
(c) a first group account based on a first group and comprising a first primary link to the first general interest account and a third set of one or more content items; and
(d) a second group account based on a second group and comprising a second primary link to the second general interest account and a fourth set of one or more content items, the second group being a member of the first group, wherein the second group's membership in the first group causes at least one content item of the third set of one or more content items to be associated with the fourth set of one or more content items; and
(2) defining one or more personal accounts associated with one or more users stored in the memory, each personal account identifying one or more general interests; and
(3) defining a graphical user interface, wherein one or more users utilize the graphical user interface and one or more computer processors are configured to execute the graphical user interface and are configured to:
(a) in response to a particular user of the one or more users utilizing the graphical user interface and the graphical user interface identifying the first tier classification:
(1) access the particular user's personal account stored in the memory; and
(2) in response to the user's personal account identifying a first personal link to the first general interest, display the first set of one or more content items corresponding to the first general interest account, and
(3) in response to the user's personal account identifying a second personal link to the first group, display the third set of one or more content items corresponding to the first group account, and
(b) in response to a particular user of the one or more users utilizing the graphical user interface and the graphical user interface identifying the second tier classification:
(1) access the particular user's personal account stored in the memory; and
(2) in response to the user's personal account identifying the first personal link to the first general interest, display the second set of one or more content items corresponding to the second general interest account, and
(3) in response to the user's personal account identifying a third personal link to the second group, display the fourth set of one or more content items corresponding to the second group account.

10. The method of claim 9, wherein:
each interest directory further comprises:
a third general interest account based on the first general interest and corresponding to a third tier classification subordinate to the second tier classification, the third general interest account comprising a fifth set of one or more content items; and
a third group account based on a third group and comprising a third primary link to the third general interest account and a sixth set of one or more content items; and
the one or more computer processors are configured to:
in response to a particular user of the one or more users utilizing the graphical user interface and the graphical user interface identifying the third tier classification:
(1) access the particular user's personal account stored in the memory; and
(2) in response to the user's personal account identifying the first personal link to the first general interest, display the fifth set of one or more content items corresponding to the third general interest account, and
(3) in response to the user's personal account identifying a fourth personal link to the third group, display the sixth set of one or more content items corresponding to the third group account.

11. The method of claim 9, wherein the tier classification is based on geographic location.

12. The method of claim 11, wherein the tier classification comprises national, regional, metro, and local, and the regional tier is subordinate to the national tier, the metro tier is subordinate to the regional tier, and the local tier is subordinate to the metro tier.

13. The method of claim 9, wherein the tier classification is based on an organizational structure.

14. The method of claim 9, wherein the one or more content items comprise information related to the corresponding account, applications related to the corresponding account, social tools related to the corresponding account, and a directory providing an aggregated view of shortcuts to one or more other accounts.

15. The method of claim 9, wherein the graphical user interface comprises a web application and the one or more computer processors executing the graphical user interface are configured to:

in response to a particular user of the one or more users utilizing the graphical user interface and the graphical user interface identifying the first tier classification:
   (1) access the particular user's personal account stored in the memory; and
   (2) in response to the user's personal account identifying the first personal link to the first general interest, display a first web page comprising the first set of one or more content items corresponding to the first general interest account, and
   (3) in response to the user's personal account identifying the second personal link to the first group, display a second web page comprising the third set of one or more content items corresponding to the first group account.

16. The method of claim 9 wherein the one or more computer processors are configured to:

in response to a particular user of the one or more users utilizing the graphical user interface and the graphical user interface identifying the first tier classification:
   (1) access the particular user's personal account stored in the memory; and
   (2) in response to the user's personal account identifying the personal second link to the first group and one or more roles associated with the first group, display a subset of the second set of one or more content items based on the one or more roles.

17. A non-transitory computer-readable medium containing code executable by one or more computer processors for providing a community interest network, the code comprising one or more components adapted for:
   (1) defining a hierarchical directory structure comprising one or more interest directory structures based on a tier classification, each interest directory structure comprising:
      (a) a first general interest account based on a first general interest corresponding to a first tier classification and comprising a first set of one or more content items;
      (b) a second general interest account based on the first general interest and corresponding to a second tier classification subordinate to the first tier classification, the second general interest account comprising a second set of one or more content items;
      (c) a first group account based on a first group and comprising a first primary link to the first general interest account and a third set of one or more content items; and
      (d) a second group account based on a second group and comprising a second primary link to the second general interest account and a fourth set of one or more content items, the second group being a member of the first group, wherein the second group's membership in the first group causes at least one content item of the third set of one or more content items to be associated with the fourth set of one or more content items; and
   (2) defining one or more personal accounts associated with one or more users, each personal account identifying one or more general interests; and
   (3) providing a graphical user interface, wherein one or more users utilize the graphical user interface and one or more computer processors are configured to execute the graphical user interface and are configured to:
      (a) in response to a particular user of the one or more users utilizing the graphical user interface and the graphical user interface identifying the first tier classification:
         (1) access the particular user's personal account stored in a memory; and
         (2) in response to the user's personal account identifying a first personal link to the first general interest, display the first set of one or more content items corresponding to the first general interest account, and
         (3) in response to the user's personal account identifying a second personal link to the first group, display the third set of one or more content items corresponding to the first group account, and
      (b) in response to a particular user of the one or more users utilizing the graphical user interface and the graphical user interface identifying the second tier classification:
         (1) access the particular user's personal account stored in the memory; and
         (2) in response to the user's personal account identifying the first personal link to the first general interest, display the second set of one or more content items corresponding to the second general interest account, and
         (3) in response to the user's personal account identifying a third personal link to the second group, display the fourth set of one or more content items corresponding to the second group account.

* * * * *